No. 608,850. Patented Aug. 9, 1898.
W. F. FOLMER.
TRIPOD.
(Application filed Aug. 20, 1897.)
(No Model.)
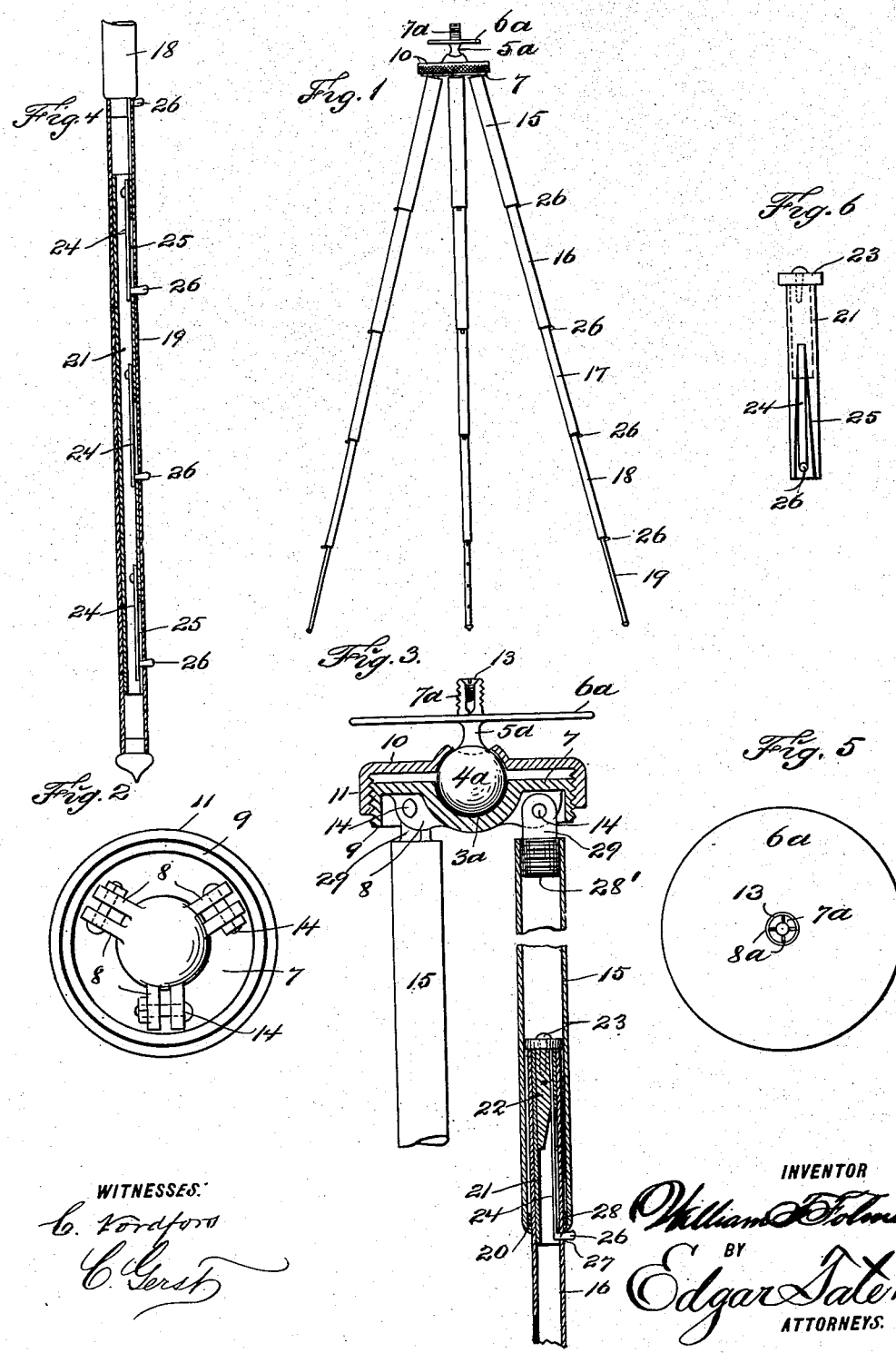
WITNESSES:
INVENTOR
William Folmer
BY
Edgar Tate & Co.
ATTORNEYS.

UNITED STATES PATENT OFFICE.

WILLIAM F. FOLMER, OF NEW YORK, N. Y.

TRIPOD.

SPECIFICATION forming part of Letters Patent No. 608,850, dated August 9, 1898.

Application filed August 20, 1897. Serial No. 648,906. (No model.)

*To all whom it may concern:*

Be it known that I, WILLIAM F. FOLMER, a citizen of the United States, residing at New York, in the county of New York and State of New York, have invented certain new and useful Improvements in Tripods, of which the following is a full and complete specification, such as will enable those skilled in the art to which it appertains to make and use the same.

This invention relates to tripods for use in supporting cameras and other articles; and the object thereof is to provide an improved device of this class which is simple in construction and operation and which is designed to support a camera or other article at any desired height, a further object being to provide a tripod the legs of which are composed of separate telescopic sections which are provided with locking devices, whereby they may be secured in the extended position, a further object being to provide a tripod of this class the lower leg-sections of which are provided with a plurality of locking devices, whereby they may be locked in a fully or partially extended position, as may be desired; and with these and other objects in view the invention consists in the construction, combination, and arrangement of parts hereinafter described and claimed.

The invention is fully disclosed in the following specification, of which the accompanying drawings form a part, in which—

Figure 1 is a side view of my improved tripod; Fig. 2, a bottom plan view of the head thereof. Fig. 3 is a partial vertical central section, somewhat enlarged, of Fig. 1; Fig. 4, a longitudinal section, on an enlarged scale, of one of the lower telescopic sections of one of the legs of the tripod; Fig. 5, a plan view of the top thereof, and Fig. 6 a side view of one of the locking devices or tubes which I employ for holding the separate sections of the legs of the tripod in their extended position.

In the drawings forming part of this specification the separate parts of my improvements are designated by the same numerals of reference in each of the views, and in the practice of my invention I provide a circular tripod-head 7, which is provided with three radial sets of jaws 8, which are formed on the bottom thereof, and the head 7 is provided with a depending rim or flange 9, screw-threaded on the outer side, and a cap 10, provided with a depending rim or flange 11, screw-threaded on its inner side and screwed onto the head 7, and formed in the head 7 and cap 10 is a spherical chamber 3ª, which opens upwardly through the cap 10, and mounted in said chamber is a ball 4ª, provided with a shank 5ª, on which is mounted a disk or plate 6ª, and said shank projects upwardly and is formed into a split screw 7ª, the splits therein being shown at 8ª in Fig. 5, and passing thereinto is a screw 13, and the screw 7ª serves as means for securing cameras or other devices to the tripod or to the caps 7 and 10, and the object of splitting the upper end of the screw 7ª is to provide means to enlarge the same, so as to adjust the size thereof in cross-section when necessary; but this feature is not an essential element of my invention and may or may not be employed.

The separate legs of the tripod, three of which are shown, are pivotally connected with the jaws 8 of the head 7 of the tripod, as shown at 14, and each of these legs consist of a plurality of telescopic tubular or other sections, five of which are shown in the drawings, and these sections are designated for the purposes of description by the reference-numerals 15, 16, 17, 18, and 19. The lower end of each of these sections, with the exception of the lower section, is provided with an inwardly-directed flange or rim 20, and the upper end of each of the sections, with the exception of the top section 15, is provided with a tubular plug 21, in the upper end of which is secured a plug 22, to the upper end of which is secured a circular disk or head 23, which is adapted to closely fit the tubular section in which it is placed, and secured to the plug 22 is a spring 24, which moves in a slot 25, formed in the lower end of said tubular plug 21, and the spring 24 is provided on its lower end with a pin or projection 26, which is adapted to pass through a corresponding hole 27 in the tubular section in which the tubular plug 21 is placed.

It will be understood that each of the sections 16, 17, 18, and 19 is constructed in the same manner, and each of said sections is also provided with a packing-ring 28, which is secured thereon and which is adapted to limit the outward movement of the section with which it is connected, and when each of said sections is projected to its fullest extent a portion thereof will still remain in the section in which it moves, so as to give strength and stability to the device.

The upper section 15 is provided with a screw-threaded plug 28', on which is formed an extension 29, by means of which it is connected with the tripod-head 7 or the jaws 8 thereof, and the operation of this part of the construction will be readily understood from the foregoing description, when taken in connection with the accompanying drawings, and the following statement thereof.

When the separate sections of each of the telescopic legs of the tripod are in their projected position, the pins 26 will pass through the openings 27 and will hold said sections in their projected position, and in order for the device to be closed up the pins 26 must be pressed inwardly and the sections in which they are placed are shoved inwardly into the adjacent upper sections, as will be readily understood.

The tubular plug 21, in which the plug 22 and the spring 24 are placed, is shown in section in Fig. 3, and a side view thereof is given in Fig. 6, and I have also shown in Fig. 4 a longitudinal section of the lower telescopic sections 19 of one of the legs of the tripod, said Fig. 4 being on an enlarged scale. The only difference between this section of one of the legs of the tripod and the other sections, with the exception of the upper section 15, consists in the fact that said lower section is provided with a single tubular plug 21 and the connected springs 24, and in this case the plugs 22 are omitted, and the object of this construction is to provide means for more nicely adjusting the height or the length of the legs, and the slots 25 are also provided in the tubular plug 21.

It will thus be seen that I accomplish the object of my invention by means of a device which is simple in construction and operation, and it will be apparent that my invention can be folded into a compact form, and in practice the separate telescopic sections of such legs are of the same or substantially the same length, so as to facilitate this operation, and the length of the legs of the tripod when folded together is but slightly greater than the length of one of the sections of which said legs are composed.

It will also be apparent that changes in and modifications of the construction herein described may be made without departing from the spirit of my invention or sacrificing its advantages, and I reserve the right to make all such alterations therein and modifications thereof as fairly come within the scope of the invention.

Having fully described my invention, I claim as new and desire to secure by Letters Patent—

1. A tripod consisting of a head, a support connected therewith, and legs pivotally connected with said head, said legs being composed of pivoted and telescopic sections, and the telescopic sections with the extension of the lower section being each provided at its lower end with an inwardly-directed flange or rim, plugs secured in said telescopic section and provided with circular heads at their upper ends, and packing-rings secured in the bottom of each of said sections except the bottom section, and springs secured to said plugs, the lower ends of which project below said sections, and are provided with outwardly-directed pins, each of said sections being provided with holes through which said pins pass, substantially as described.

2. A tripod provided with legs composed of tubular pivoted and telescopic sections, said telescopic sections with the exception of the lower section being each provided at its lower end with an inwardly-directed flange or rim, and each telescopic section being provided with a tube which is secured therein, a plug secured in said tube, a circular head secured to the end of said plug, a spring secured to said plug and provided at its lower end with a pin or projection, and a hole in the side of the section through which said pin passes, substantially as shown and described.

3. A tripod consisting of a head provided with a depending flange exteriorly screw-threaded and having a curved socket formed in its upper surface, legs pivotally connected with said head, a cap having an interiorly-threaded depending flange whereby it is adjustably secured to said head and provided with a curved socket formed in its under surface, a support provided with a ball at one end adapted to be received by the sockets of said head and cap forming a ball-and-socket joint and a disk or plate carried by said support, substantially as shown and described.

In testimony that I claim the foregoing as my invention I have signed my name, in presence of the subscribing witnesses, this 18th day of August, 1897.

WILLIAM F. FOLMER.

Witnesses:
C. GERST,
A. C. VAN BLARCOM.